Feb. 27, 1962 R. R. BOOTH 3,023,400

NON-DESTRUCTIVE READ OUT FERRITE MEMORY ELEMENT

Filed Oct. 24, 1960 2 Sheets-Sheet 1

INVENTOR
RICHARD R. BOOTH

BY Sughrue, Rothwell, Mion & Zinn
ATTORNEYS

United States Patent Office 3,023,400

Patented Feb. 27, 1962

3,023,400
NON-DESTRUCTIVE READ OUT FERRITE MEMORY ELEMENT

Richard R. Booth, Peekskill, N.Y., assignor to International Business Machines Corporation, New York, N.Y., a corporation of New York Filed Oct. 24, 1960, Ser. No. 64,607
7 Claims. (Cl. 340—174)

This invention relates to a memory element and systems employing same, and more particularly to a multipath magnetic core and systems employing the same in which anti-coincident type of writing and non-destructive read out of said core is obtained.

As is well known, magnetic cores of toroidal shape are commonly employed in computers and similar systems. These cores have a hysteresis characteristic such that they function as two-state devices. A core may be switched into one or the other of its stable states of remanence by the simultaneous application to said core of two half select currents. In the usual case read out is achieved by applying to said core a read out pulse of full select amplitude in a direction opposite to the write pulses. A sense winding associated with the core detects any change of state resulting from said read out. It is fundamental in a system of this type that the half select pulses occur coincidentally. It is also fundamental that upon read out it is expected that the state of the core be destroyed. However, according to the present invention, an anti-coincident current selection system is employed using multipath cores instead of the conventional toroids to achieve a non-destructive type of read out in which the state of the core is not destroyed. In furtherance of such an objective, cores having a low coercive force ($H_c$) are employed. Particularly, the material which comprises the cores of the present invention belong to that class of materials identified as ferrites. The ferrites finding particular utility in the present invention have a fast switching time requiring much less drive than required with high $H_c$ materials. A typical example of such a material is manganese-magnesium ferrite. Although such materials may not be characterized by a completely rectangular hysteresis loop, it is sufficiently so for practical purposes. Since an anti-coincident method of writing is employed, drive current tolerances are not as great as those required in the coincident type of writing. In materials having a low $H_c$, the ratio of remanent flux to saturation flux is small. It therefore follows that read out of these cores provides a relatively significant output with relation to the output obtained from materials having a high $H_c$.

It is therefore one object of the present invention to provide a multipath core of the non-destructive read out type.

It is a further object of the present invention to provide a means for anti-coincident writing into such cores.

It is a further object of this invention to provide matrices employing such cores to function as a high speed memory.

These and other objects will become apparent from a detailed description of the accompanying drawings.

Figures 1, 2:
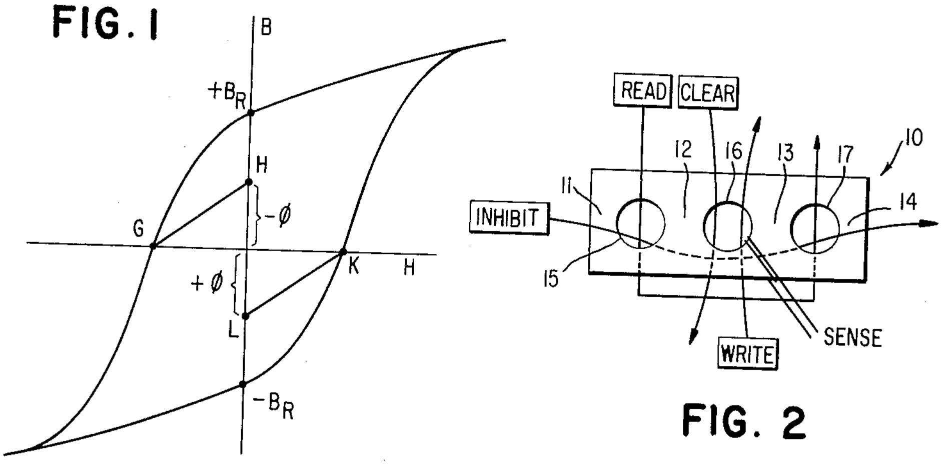
FIGURE 1 is a graph of the hysteresis curve of magnetic material of which the core elements used in the present invention are composed.
FIGURE 2 is a schematic illustration of one form of multipath core which may be employed in accordance with the present invention.

Turning first to FIGURE 2, this core embodiment includes a multipath core 10 of ferrite material. The core has four legs indicated as 11, 12, 13, and 14. The core also includes three holes 15, 16, and 17. The holes 15 and 17 may be symmetrically located in the core with respect to hole 16 and have their respective centers located on the horizontal center-line of said core. The diameters of all the holes may be substantially equal. A core of 70 by 100 mils and 15 mils thick can be employed. Holes of about 20 mils diameter may be provided. The winding associated with the Clear driver passes through hole 16. The Write winding passes through hole 16 also. The Sense winding is a double-turn winding passing through hole 16. The Read winding passes down through hole 15 and up through hole 17. The Inhibit winding is wound similarly to the Read winding. Of course the Clear and Write windings may be the same single winding associated with a single bi-polar driver.

Figure 2A:
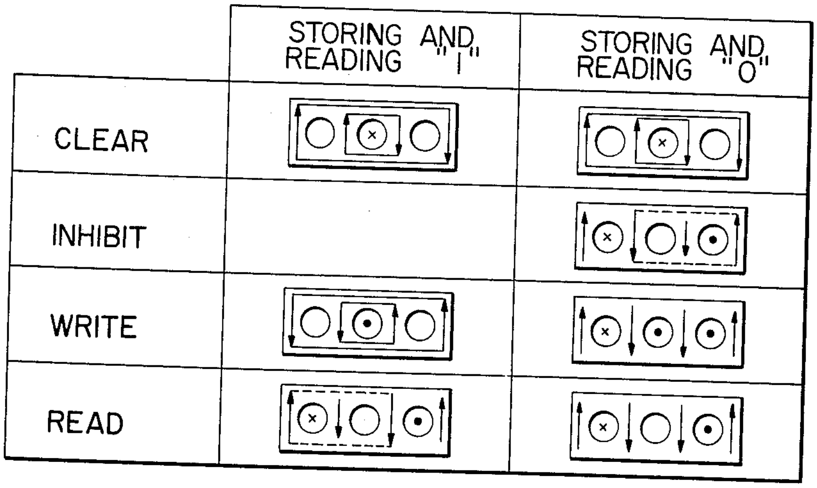
FIGURE 2a is a schematic illustration accompanied by legends showing the flux distribution around the various legs of the core shown in FIGURE 2 under specified conditions.

Turning now to FIGURE 2a, there are shown arrows for each of the legs indicating the direction of flux. The flow of the current into and out of the paper is in the conventional form. First, with regard to Clear, current is passed through the Clear winding down through hole 16. Referring to FIGURE 1, this places the core substantially at $-B_r$ on the hysteresis curve. All of the legs are then substantially at saturation. The pulses which are involved here may be of the order of about .2 microsecond. Now, if the object is to store a 1, no Inhibit pulse is applied. Then the next pulse applied to the core is the Write pulse. This completely reverses the state of saturation of each of the four legs as indicated in FIGURE 2a. As shown, the Write pulse passes up through hole 16. At this time the next flux distribution around the center hole 16 is as shown, that is, in a counterclockwise direction. At this time, the core has been moved from $-B_r$ to $+B_r$ by the Write pulse. Now to read out the 1 so stored, a Read pulse is applied in the direction indicated. Some of the domains around hole 16 are switched so that the net flux is reduced or slides, as shown in FIGURE 1, to point G. In this particular case we have assumed a Read pulse sufficiently wide to switch all reversible and irreversible domains. This excursion may, however, take place as a result of a plurality of narrower Read pulses. The flux pattern in the four legs is shown in FIGURE 2a. According to the right-hand rule, the Read pulse attempts to create a net flux distribution around hole 17 in a counterclockwise direction and around hole 15 in a counterclockwise direction. This is achieved in the present instance by switching the direction of flux in legs 11 and 13, since the direction of the flux in legs 12 and 14 is already in the proper direction as seen by the Read pulse. The switched legs then are legs 11 and 13.

Upon removal of the Read pulse, the net flux around hole 16 will relax to point H on the hysteresis curve of FIGURE 1. This is due to the switching of the reversible domains. Successive Read pulses applied to the core in a state represented by point H in the hysteresis curve of FIGURE 1 will cause the core to shift back to point G as a result of the switching of these reversible domains to achieve non-destructive read out. The sense winding then will detect a negative flux change as shown in FIGURE 1.

Relative to storing and reading of a 0, the procedure is substantially the same except that following Clear an Inhibit pulse is applied in the direction indicated in FIGURE 2*a*. It should be noted that this Inhibit pulse goes through the same holes as the Read pulse and, consequently, has in general the same effect on the core as the Read pulse. Recalling that the condition of the core after the Clear pulse was one of negative remanence and indicated by $-B_r$ on the curve of FIGURE 1, the Inhibit pulse causes the core to shift to point K, the switching of both reversible and irreversible domains accomplishing this shift. Again, referring to FIGURE 2*a*, it can be seen that the Inhibit pulse tends to establish a flux distribution around hole 17 in a counterclockwise direction and around hole 15 in a clockwise direction. This is done by the Inhibit pulse by switching legs 14 and 12. The net flux distribution around hole 16 as a result of the Inhibit pulse is as shown in FIGURE 2*a*. Shortly after the Inhibit pulse commences, the Write pulse is applied. The Write pulse terminates shortly before the Inhibit pulse. The Write pulse again, due to the right-hand rule, will attempt to create a net flux pattern in a counterclockwise direction around hole 16. However, it finds that legs 11 and 12 are already saturated and, consequently, there is no way in which to establish this counterclockwise flux pattern around the center hole. Therefore, there is no change in flux pattern around hole 16 as a result of the Write pulse. As the Inhibit expires, the reversible domains move the core from K to L. The Read pulse is then applied. The reversible domains switch and move the core from L to K. The Read pulse is the same as the Inhibit pulse and therefore the resultant flux distribution is the same as achieved by the Inhibit pulse. Termination of Read moves the core back to L. Each successive Read pulse will drift the core from L to K to generate a net flux change in the positive direction which is sensed by the sense winding. Following each Read pulse, the core will resume the state indicated by point L.

Figure 3:
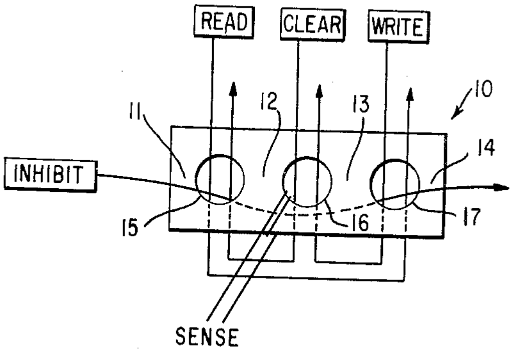
FIGURE 3 is another form of core which may be employed in accordance with the present invention.
Figure 3A:
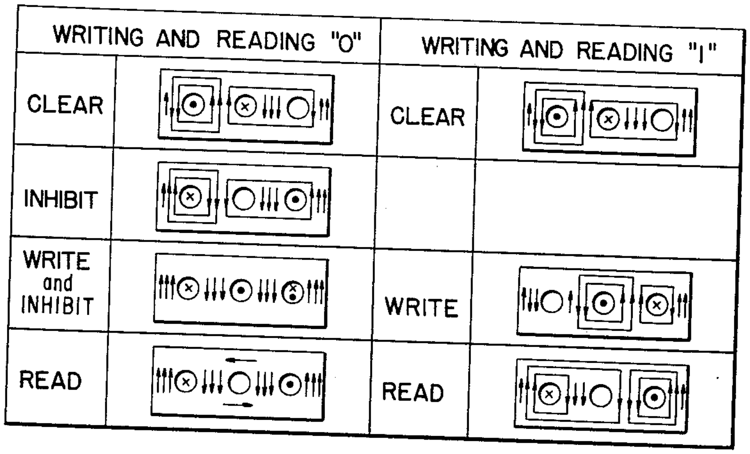
FIGURE 3a is a schematic illustration accompanied by legends showing the flux distribution around the various legs of the core shown in FIGURE 3 under specified conditions.

Now referring to FIGURE 3 and to another embodiment of the invention, the core indicated therein is substantially the same as that shown in FIGURE 2 except the Clear winding is passed through holes 16 and 15 and the Write winding through holes 16 and 17. Referring to FIGURE 3*a*, the method of writing a 0 and a 1 into the core of FIGURE 3 and reading out therefrom is identical to that as illustrated with respect to the core of FIGURE 2. However, the flux patterns are somewhat different. These patterns have been determined experimentally and for illustration purposes it has been found best to show each leg as composed of three arrows indicating flux direction. Since, however, the sense winding is wound about hole 16, the net flux distribution around this hole is of primary importance. All of the flux paths as indicated by the arrows have not been joined up in these figures but only those which are important in following the flux orientation from one pulse to the next On the Clear operation, for instance, the net flux distribution around hole 16 is as shown, that is, in a clockwise direction. This was the same as in the case of the core of FIGURE 2. This places the core at a state of $-B_r$ as shown in FIGURE 1. Next, the Inhibit pulse is applied, in the case of a 0. Again, the Inhibit pulse attempts to create a counterclockwise flux distribution around hole 17 and a clockwise distribution around hole 15. This results effectively in the switching of leg 12 and the net flux distribution around hole 15 is effectively zero—point K on the curve of FIGURE 1. Next, the Write pulse is applied and, again as in the case of the core of FIGURE 2, is concurrent for a time with the Inhibit pulse. Effectively, the currents in the opposite directions in hole 17 cancel each other as far as any effect on the flux distribution in the core. Consequently, the currents in holes 15 and 16 are to be considered. The current through hole 15 is attempting to maintain the same flux pattern as before. However, the current through hole 16 is attempting to switch the flux pattern in leg 11 in accordance with the right-hand rule. However, the Inhibit current is in the present instance equal to or somewhat larger than the Write current and, consequently, this switching is not possible. Therefore, there is no way for the Write pulse to change the flux pattern established by the Inhibit pulse. As the overlapping Inhibit expires, the reversible domains around hole 15 cause the core to relax to point L. Next, the Read pulse is applied through holes 15 and 17. The Read pulse again is the same as the Inhibit pulse and consequently it establishes the same net flux distribution around hole 15, causing the core to shift to point K. The reversible domains account for this shift. The flux distribution around hole 16 has been found experimentally to be in the direction indicated by the horizontal arrows—that is, in a counterclockwise direction. This is verified by the polarity of the output pulse on the sense winding resulting from the application of the Read pulse. Here again the state of core moves between points L and K in successive read outs of a 0, always returning to point L on expiration of Read. Here again point K may be reached by a single wide Inhibit or a plurality of narrow Inhibit pulses.

The flux patterns resulting from the application of the various pulses for writing and reading a 1 are as shown in FIGURE 3*a*. Upon the read out of a 1, a negative flux change is noted by the sense winding and in the case of the read out of a 0, a positive flux change is detected by the sense winding.

In connection with the operation of both embodiments above described, it is best that the Write pulse should not be of sufficiently high amplitude so that it exceeds the Inhibit pulse because if such were the case there might be a tendency to, for instance, switch leg 14 in connection with the second embodiment and leg 11 in connection with the first embodiment. If this did take place, it can be seen that the flux distribution around hole 17 in both cases would be changed and this, of course, would change the flux distribution around hole 16. This of course is to be avoided. There must be no change introduced by the Write pulse around the center hole when writing a 0. It should also be noted that in connection with both embodiments the Inhibit pulse saturates at least one leg which the Write pulse, when it is applied, attempts to switch. If it had not been for the presence of the Inhibit pulse, the Write pulse would have switched at least this one leg to provide the pattern which the Read pulse sees.

Figure 4:
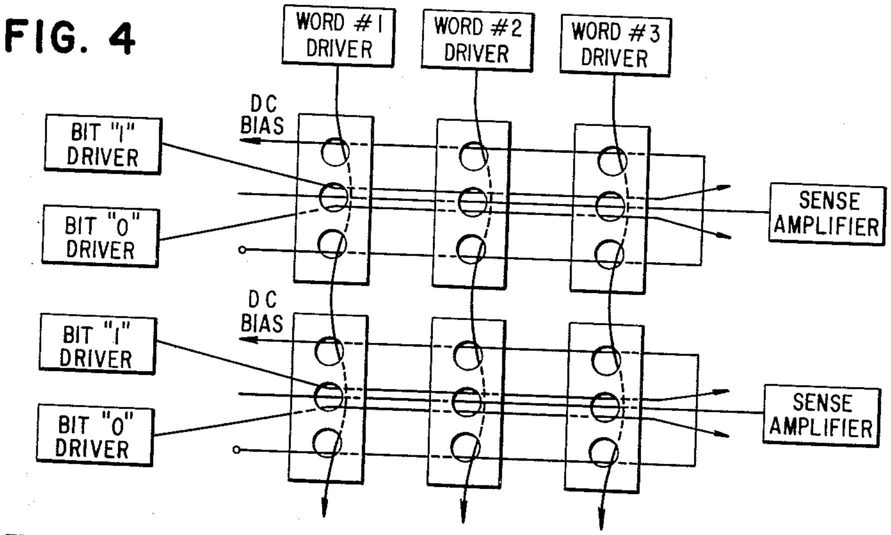
FIGURE 4 is one form of matrix which may be employed in accordance with the present invention.

Referring now to FIGURE 4, there is shown a two-dimensional core matrix employing the cores of the present invention. The words are stored in the horizontal columns of the matrix. In one method of operation, the bias is on continually and holds the core in a state of saturation illustrated by the Inhibit flux pattern in FIGURE 2*a* ("0" column). When, for instance, word 1 driver is turned on, this bias current is effectively cancelled in all the cores in column 1, without changing the flux pattern. Now the bit drivers may be turned on and will store a 1 or a 0 by appropriately changing the flux pattern, a change made possible by the neutralization of the bias current by the word 1 driver current. So, if bit "1" driver is turned on, a pattern as illustrated by Write in FIGURE 2*a* ("1" column) is created in the core in column 1 of the matrix. The core in column 2 row 1 is not so switched because the bias is not cancelled therein and said bias holds all legs against switching. To read out the 1 so stored, the word 1 driver is again turned on and non-destrictive read out is obtained.

Another arrangement which can be employed in connection with FIGURE 4 involves the elimination of the bias winding. In this arrangement the word drivers are on all the time. To write a "1" in word 1, the word 1 driver is turned off and the bit "1" driver is turned on. To write a "0," the word 1 driver is turned off and the bit "0" driver is turned on. At the termination of writing, the word 1 driver is turned back on. To read out the cores of word 1, the word 1 driver is turned off. Such an alternative arrangement can be employed only with a minimum number of words because of tne large power supply requirements.

Figure 5:
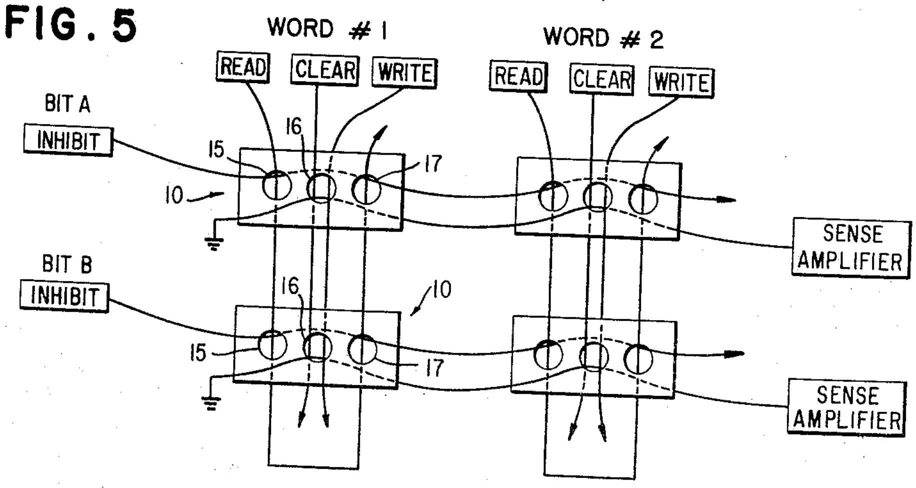
FIGURE 5 is another form of matrix which may be employed in accordance with this invention.

FIGURE 5 illustrates a matrix which may employ the cores of the present invention. Again words are stored in columns composed of a plurality of bits. The Clear pulse is passed through only holes 16 of each core as shown here (comparable to the core of FIGURE 2), but may also be passed back through holes 15 (comparable to FIGURE 3). The same analogy is made for the Write pulse. A 1 or 0 is stored in a particular core by respectively not applying or applying the particular bit Inhibit pulse.

The foregoing description of the internal operation of the core is based upon a theory developed from observation of the external manifestations resulting from application of currents in the manner described.

What has been disclosed are various embodiments of the present invention. Other embodiments obvious from the teachings herein to those skilled in the art are contemplated to be within the spirit and scope of the following claims.

What is claimed is:

1. A magnetic storage device for storing binary bits therein comprising a body of magnetic material having two stable states, said body having a central hole therein and first and second holes on opposite sides thereof, first winding means wound through at least said central hole, second winding means wound through at least said central hole, third winding means wound through said first and second holes, first drive means for applying current to said first winding means to establish a flux polarity in one direction about said central hole, second drive means for applying current to said third winding means substantially to reduce toward zero the net flux distribution around said central hole and third drive means for applying current to said second winding means to establish a flux polarity in a second direction about said central hole only in the absence of current from said second drive means whereby a binary bit of one type is stored by the sequential application of said first and third drive means and a binary bit of another type is stored by the sequential application of said first drive means followed by overlapping applications of said second and third drive means.

2. A magnetic storage device as claimed in claim 1 wherein said first winding means is wound through said central hole and said first hole and said second winding means is wound through said central hole and said third hole.

3. A magnetic storage device as claimed in claim 2 further including fourth winding means wound through said first and second holes, sense winding means wound through said central hole and fourth driving means for applying current to said fourth winding means to produce an output signal in said sense winding means indicative of the type of binary bit stored by said device.

4. A matrix of magnetic storage devices for storing binary bits in each of said devices including a plurality of cores arranged in columns and rows, each core comprising a body of magnetic material having two stable states, said body having a central hole therein and first and second holes on opposite sides thereof, a first winding means associated with each column wound through said first and second holes in all cores in said column, a second and third winding means associated with each row wound through said central hole of each core in said row, a bias winding means associated with each row wound through said first and second holes of all cores in said row, bias driving means to continuously supply current to each of said bias winding means, a first driving means associated with each of said first winding means for applying a current pulse thereto, a second driving means associated with each of said second winding means for applying a current pulse thereto whereby concurrent pluses from one of said first driving means and one of said second driving means stores a first type of binary bit in the core associated with said one first driving means and one second driving means and a third driving means associated with each of said third winding means for applying a current pulse thereto whereby concurrent pulses from one of said first driving means and one of said third driving means stores a second type of binary bit in the core associated with said one first driving means and said one third driving means.

5. A matrix as defined by claim 4 further including a sense winding means associated with each row wound through said central hole of all cores in said row whereby subsequent to storage of bits in said cores a current pulse from one of said first driving means couples an output signal to said sense winding means indicative of the type of binary bits stored by each of the cores in the column associated with said one first driving means.

6. A matrix of magnetic storage devices for storing binary bits in each of said devices including a plurality of cores arranged in columns and rows, each core comprising a body of magnetic material having two stable states, said body having a central hole therein and first and second holes on opposite sides thereof, first and second winding means associated with each column wound through said central hole in all cores in said column, a third winding means associated with each row wound through said first and second holes in all cores in said row, a first driving means associated with each of said first winding means for applying a current to said first winding means to establish a flux polarity in one direction about the central hole of all cores associated with said first winding means, a third driving means associated with each of said third winding means for applying a current to said third winding means substantially to reduce toward zero the net flux distribution around each of the central holes of the cores associated with said third winding means, and a second driving means associated with each of said second winding means for applying current to said second winding means to establish a flux polarity in the second direction about the central holes of all the cores associated with said second winding means only in the absence of current from said third driving means whereby a binary bit of one type is stored by the sequential application of said first and second driving means and a binary bit of another type is stored by the sequential application of said first driving means followed by overlapping applications of said second and third driving means.

7. A matrix as defined in claim 6 further including a fourth winding means associated with each column wound through said first and second holes in all cores in said column and a sense winding means associated with each row wound through said central hole of all of the cores in said row, a fourth driving means associated with each of said fourth winding means for applying a current to said first winding means to couple an output signal from each of the cores associated with said fourth winding means to its associated sense winding means.

No references cited.